UNITED STATES PATENT OFFICE.

GEORGE CHAMBERS HENRY, OF BURLINGTON, IOWA.

PROCESS OF PREPARING CARBONATED BEVERAGES.

SPECIFICATION forming part of Letters Patent No. 436,782, dated September 23, 1890.

Application filed May 15, 1889. Serial No. 310,791. (No specimens.)

*To all whom it may concern:*

Be it known that I, GEORGE CHAMBERS HENRY, a citizen of the United States, residing at Burlington, in the county of Des Moines, in the State of Iowa, have invented a certain new and useful Improvement in the Preparation and Manufacture of Carbonated Beverages, whereby the same are improved in delicacy and flavor, are caused to assume the form of foam or whipped cream, are rendered nutritious and healthful, and retain more uniformity and for a greater period the carbonic-acid gas or other gas used to carbonate them; and I do hereby declare the following to be a full, clear, and accurate description of the invention, which will enable others skilled in the art to which it appertains to make and use the same.

Heretofore ordinary soda-water and similar beverages have been prepared and made by charging and carbonating plain water and by charging or mixing the same in the sirups and flavors. Ordinary soda-water as served is served usually by adding the carbonated water to flavored sirups. It is usual to add other substances—such as natural cream—to the flavored sirups, so that when agitated by the introduction of carbonated water escaping from pressure or by otherwise mixing the beverage is rendered frothy and light, making it lighter and richer to the taste; but when cream or other material is thus added to enrich the beverage or give it body it, together with sirups and flavors, has always been used in its natural state or condition, and I am not aware that such enriching material or the sirups and flavors introduced have ever been charged or carbonated. In consequence, when the enriching material is thus employed, either with or without sirups or flavors, it at once absorbs and takes up a portion of the carbonic-acid gas introduced in the charged water drawn from the fountain or charging-tank, reducing the necessary and desirable proportion of gas in the beverage and removing much of its vitality and tending to render it somewhat flat and incapable of retaining a uniform or homogeneous form of foam or froth, somewhat resembling whipped cream, for any appreciable time. Mead and root-beer as usually made contain sirups, flavors, and vegetable material, which are placed in a cylinder or tank and charged with carbonic-acid gas, or they are allowed to ferment, thereby generating the gas, and the liquid thus charged is drawn from the apparatus; but when thus prepared and drawn the beverage is generally too light and frothy to contain sufficient liquid or body to be useful and acceptable, and in consequence it is then re-enforced or supplied from a suitable container with a proper and sufficient addition of similar liquid, mead, root-beer, &c., which has not been charged with gas; but the addition of the uncharged liquid has the immediate effect above noticed of absorbing a portion of the gas from the liquid drawn from the tank or retort, and thus staling and impairing the beverage.

Now, the object of my invention is to prepare and make a carbonated beverage which assumes the form of whipped cream or other light and frothy foamy material thoroughly and uniformly permeated with fine bubbles of carbonic-acid gas, composed of any suitable healthful nutritious material in solution charged with carbonic-acid gas mixed with plain carbonated water with or without sirups and flavors. I have ascertained that natural cream cannot be successfully employed, for the reason that in charging the same the pressure and introduction and absorption of the gas tends to disturb the structure of the cream and separates or segregates its various elements, although it can be with great care so employed; but to make the invention successful in a general sense the enriching material employed should be of such a character that after being charged with carbonic-acid gas and freed from the pressure of gas in the retort by being drawn into an open goblet or vessel it will at once, under the operation of the gas which it has absorbed and retains throughout its mass, expand and develop into a frothy or foamy state resembling whipped cream or the beaten white of eggs, but which, by reason of its composition and the slight plasticity of its material, does not permit the expanding gas to escape as freely as it does from plain water or other effervescing liquid. In this condition, either with or without the addition of sirups or flavors, or with such sirups or flavors having been originally introduced in the enriching material before it was charged, there is added to it a proper quantity of plain water charged with carbonic-acid gas and the charged enriching material and the carbonated water thoroughly mixed. This may be done by drawing the carbonated water from the fountain into the enriching material immediately after the latter has been drawn from its separate tank or fountain. The mixture may be made more thorough and complete by other means of agitation after the two liquids are united, as by pouring from one goblet into another or other similar method of mixing. In this manner the foamy or frothy structure of the enriching material, charged with its proper portion of carbonic-acid gas, becomes thoroughly and uniformly permeated with the disseminated carbonated water, which, by means of capillary attraction or other force, it holds and retains for some appreciable time, sufficient for its use and purpose, throughout the mass of its structure, the commingling of the body and of the enriching material and the carbonated water giving the whole the appearance and taste of whipped cream of considerable consistency and material.

While many materials may be employed as the enriching fluid, it is essential to the successful operation of my invention that while containing more or less nutritious and healthful material it should be capable of expanding under the expansive force of the carbonic-acid gas into a frothy or creamy state without parting too rapidly with the gas, which must slowly escape, and I prefer to employ a liquid capable after being carbonated of expanding under the influence of its retained gas, and which when agitated and thoroughly mixed with the carbonated water will assume and retain for a brief period the form and structure of foam or froth resembling whipped cream, although I do not limit myself to any particular liquid or composition.

I have invented and prefer to employ a composition or enriching-liquid possessing the above qualities. It consists of an infusion or tincture of sarsaparilla-root, for which a solution of dextrine or an infusion or tincture of quillaya may be substituted as an equivalent, and a solution of gelatine and sirup with or without flavor.

The proportions of the ingredients in the above enriching-liquid are as follows—basis, one ten-gallon fountain: one-half ($\frac{1}{2}$) pint tincture or infusion of sarsaparilla-root or its equivalents; one-half ($\frac{1}{2}$) pint infusion or tincture of quillaya-root, or, if dextrine be employed, the solution of eight ounces of dextrine in one gallon water; one (1) gallon of the solution of gelatine, composed of six (6) ounces of gelatine to one gallon of pure water; sirup with or without flavor. Water is added and charged with gas in the usual manner.

In the above composition the gelatine is not an essential or necessary ingredient and may be used in less proportion than above specified or it may be entirely omitted. I prefer to use it, as it tends to give body and plasticity to the enriching material; but it is not required.

In Patent No. 419,671, issued to me January 21, 1890, I have described and claimed an enriching-fluid adapted to be carbonated, made of the above ingredients. It is evident that such enriching-fluid adapted to be carbonated may be prepared and sold in tanks or retorts ready to be carbonated I do not claim the above-described composition or enriching fluid in this application, as it is not the product, but only one of the means for producing the result or product of my process, this product being a mixture made of carbonated enriching-fluid and carbonated water, effected after each is separately drawn from separate retorts under pressure.

In the operation and carrying out my art in the manufacture of my improved carbonated beverages I employ two distinct and separate tanks or fountains, in one of which I charge the plain water with carbonic-acid gas in the manner usually and commonly employed. In the other I introduce and charge the enriching-fluid with or without the sirups and flavors, it being understood that the sirups and flavors may be added when the carbonated water and enriching-fluid are drawn from the fountains and mixed. When the water and enriching-fluid are properly and sufficiently charged with gas, I draw the requisite and proper quantity into a goblet or open vessel, and then draw from the carbonated-water fountain the requisite and proper proportion of carbonated water, mixing and thoroughly compounding the same into a foamy or frothy creamy state, mixing with such sirups or flavors as may be desired.

Having thus described my invention, what I claim, and desire to secure by Letters Patent, is—

The process of preparing carbonated beverages, which consists in charging with carbonic-acid gas plain water in a retort and charging with carbonic-acid gas an enriching-fluid in another retort, then drawing them under pressure separately, and mixing and combining them in the same vessel to form a foamy creamy beverage, substantially as described.

GEORGE CHAMBERS HENRY.

Witnesses:
WM. HENDRICKS,
WM. N. LEY.